US012607461B2

(12) United States Patent (10) Patent No.: US 12,607,461 B2
Lee et al. (45) Date of Patent: Apr. 21, 2026

(54) APPARATUS FOR ULTRASONICALLY MEASURING THIN FILM THICKNESS WITH RETROREFLECTOR AND METHOD THEREOF

(71) Applicants: Seoul National University R&DB Foundation, Seoul (KR); CENTER FOR ADVANCED META-MATERIALS, Daejeon (KR)

(72) Inventors: Jeseung Lee, Anyang-si (KR); Jooa Park, Suwon-si (KR); Yoon Young Kim, Seoul (KR)

(73) Assignees: SEOUL NATIONAL UNIVERSITY R&DB FOUNDATION, Seoul (KR); CENTER FOR ADVANCED META-MATERIALS, Daejeon (KR)

( * ) Notice: Subject to any disclaimer, the term of this patent is extended or adjusted under 35 U.S.C. 154(b) by 0 days.

(21) Appl. No.: 18/029,424

(22) PCT Filed: Jan. 12, 2023

(86) PCT No.: PCT/KR2023/000583
§ 371 (c)(1),
(2) Date: Mar. 30, 2023

(87) PCT Pub. No.: WO2023/191271
PCT Pub. Date: Oct. 5, 2023

(65) Prior Publication Data
US 2025/0020457 A1     Jan. 16, 2025

(30) Foreign Application Priority Data
Mar. 29, 2022     (KR) ........................ 10-2022-0039058

(51) Int. Cl.
*G01B 17/02*          (2006.01)
*G01N 29/07*          (2006.01)
(Continued)

(52) U.S. Cl.
CPC ........... *G01B 17/025* (2013.01); *G01B 17/02* (2013.01); *G01N 29/07* (2013.01); *G01N 29/223* (2013.01);
(Continued)

(58) Field of Classification Search
CPC ................. G01B 17/02; G01B 17/025; G01N 2291/02854; G01N 2291/011;
(Continued)

(56) References Cited

U.S. PATENT DOCUMENTS 4,303,144 A * 12/1981 Wirt ........................ F24F 13/24
181/292
5,635,644 A * 6/1997 Ishikawa .............. G01B 17/025
73/644
(Continued)

FOREIGN PATENT DOCUMENTS

FR          1497377          10/1967
JP          H09-280848       10/1997
(Continued)

OTHER PUBLICATIONS

Stephanis et al, Trihedral rectangular ultrasonic reflector for distance measurements, NDT&E h~ternationaL vol. 28, No. 2, pp. 95-96, 1995 (Year: 1995).*
(Continued)

*Primary Examiner* — David L Singer
(74) *Attorney, Agent, or Firm* — LEX IP MEISTER, PLLC

(57)          ABSTRACT
A thin film thickness measuring apparatus includes: an ultrasonic retroreflector that is provided under a test object formed in the shape of a thin film and retroreflects an ultrasonic wave incident through the test object; an ultrasonic wave input portion that is provided on one side of the test object and inputting an ultrasonic wave to one side of the
(Continued)

test object; and a measurement portion that is connected to the ultrasonic wave input portion and measures an arrival time of the ultrasonic wave reflected through the test object.

8 Claims, 7 Drawing Sheets

(51) Int. Cl.
  *G01N 29/22* (2006.01)
  *G01N 29/24* (2006.01)
(52) U.S. Cl.
  CPC ..... *G01N 29/2468* (2013.01); *G01N 29/2487* (2013.01); *G01N 2291/011* (2013.01); *G01N 2291/02854* (2013.01); *G01N 2291/0421* (2013.01); *G01N 2291/0422* (2013.01); *G01N 2291/045* (2013.01); *G01N 2291/056* (2013.01); *G01N 2291/101* (2013.01); *G01N 2291/2697* (2013.01)
(58) Field of Classification Search
  CPC ..... G01N 2291/042; G01N 2291/0421; G01N 2291/0422; G01N 2291/045; G01N 2291/056; G01N 2291/101; G01N 2291/2697; G01N 29/07; G01N 29/223; G01N 29/2468; G01N 29/2487
  See application file for complete search history.

(56) References Cited

U.S. PATENT DOCUMENTS

| | | | |
|---|---|---|---|
| 2012/0055251 A1 | 3/2012 | Kono et al. | |
| 2013/0192374 A1 | 8/2013 | Voor, Jr. | |
| 2014/0020468 A1* | 1/2014 | Smith | G01N 29/346 |
| | | | 73/597 |
| 2022/0011421 A1* | 1/2022 | Baque | G01S 15/42 |

FOREIGN PATENT DOCUMENTS

| | | | | |
|---|---|---|---|---|
| JP | H11-352112 | | 12/1999 | |
| JP | 2010243176 A | * | 10/2010 | ............. G01B 17/02 |
| JP | 2012-053027 | | 3/2012 | |
| JP | 2014-507643 | | 3/2014 | |
| JP | 2021032788 A | * | 3/2021 | ............. G01N 29/28 |
| KR | 10-2007-0111147 | | 11/2007 | |
| KR | 10-2014-0077121 | | 6/2014 | |
| RU | 2625261 C1 | * | 7/2017 | ............. G01B 17/02 |

OTHER PUBLICATIONS

Ploix et al, Acoustical properties of an immersed corner-cube retroreflector alone and behind screen for ultrasonic telemetry applications, Elsevier, Ultrasonics 106 (2020) 106149 (Year: 2020).*

Song et al, Acoustic planar surface retroreflector, American Physical Society, Physical Review Materials 2, 065201 (2018) (Year: 2018).*

Fu et al, Multifunctional reflection in acoustic metagratings with simplified design, AIP Publishing, Appl. Phys. Lett. 114, 053502 (2019); doi: 10.1063/1.5083081 114, 053502-1 (Year: 2019).*

Franco et al, Shear-wave corner retroreflector device for ultrasonic measurement of viscosity, Elsevier, Ultrasonics 117 (2021) 106538 (Year: 2021).*

Ruan et al, Retroreflection of flexural wave by using elastic metasurface, AIP Publishing, J. Appl. Phys. 128, 045116 (2020); doi: 10.1063/5.0005928 (Year: 2020).*

Li et al, Perfect retroreflection assisted by evanescent guided modes in acoustic metagratings, AIP Publishing, Appl. Phys. Lett. 120, 151701 (2022); doi: 10.1063/5.0084253 (Year: 2022).*

Shen et al, A Surface Impedance-Based Three-Channel Acoustic Metasurface Retroreflector, arXiv:1803.01194v1 [physics.app-ph] 3, Mar. 2018 (Year: 2018).*

Lee, Jeseung, et al. "Uni-modal retroreflection in multi-modal elastic wave fields." International Journal of Mechanical Sciences 232 (Available online on Aug. 17, 2022): 107655. pp. 1-9.

Xu Chunguang et al., "Ultrasonic Guided Wave Testing Method", Fundamnetals of Ultrasonic Testing, Beijing Institute of Technology Press, Beijing, China, Sep. 30, 2020, total 6 pages.

* cited by examiner t : Thin film thickness, θ : Incident angle

APPARATUS FOR ULTRASONICALLY MEASURING THIN FILM THICKNESS WITH RETROREFLECTOR AND METHOD THEREOF

TECHNICAL FIELD

A thin film thickness measuring apparatus and a method thereof are provided.

BACKGROUND ART

Forming a micro-scale thin film or nano-scale thin film with a uniform thickness is one of the most important processes in industry. For example, a semiconductor process necessarily includes a process of coating a thin film of uniform thickness on a wafer to form a protective film for distinguishing regions to be etched on the wafer. The quality of the thin film is determined by the uniformity of thickness of the thin film, and the quality of the thin film has a great influence on the degree of integration and performance of the finished semiconductor. Accordingly, accurate thin film thickness measurement technology is required to produce high-quality semiconductor products. However, as the semiconductor process advances, it is becoming difficult to measure thin film thickness.

The principle of measuring a thickness of a thin film using ultrasonic waves is to calculate the thickness of the thin film by measuring the reflection time of the ultrasonic wave incident normally on the thin film and returning. For example, thin film thickness may be measured using an ultrasonic microscope. Since the propagation distance of the ultrasonic wave inside the thin film becomes shorter as the thickness of the thin film becomes thinner, there is a limit to measuring the thickness of the thin film in which the reflected ultrasonic wave signal cannot be distinguished any longer. Accordingly, there is a demand for the development of a thin film thickness measurement method and device that can overcome such a measurement limitation.

DISCLOSURE

Technical Problem

An embodiment is to provide a thin film thickness measuring apparatus and a method that can overcome the measurement limitations of ultrasonic wave signals reflected when measuring thin film thickness.

Technical Solution

A thin film thickness measuring apparatus according to an embodiment includes: an ultrasonic retroreflector that is provided under a test object formed in the shape of a thin film and retroreflects an ultrasonic wave incident through the test object; an ultrasonic wave input portion that is provided on one side of the test object and inputting an ultrasonic wave to one side of the test subject; and a measurement portion that is connected to the ultrasonic wave input portion and measures an arrival time of the ultrasonic wave reflected through the test object.

The ultrasonic wave input portion may include: an ultrasonic wave transmitting/receiving portion that transmits an ultrasonic wave of a predetermined frequency to the test object in advance and observes the inside of the test object; and an oblique incident portion provided on one side of the ultrasonic wave transmitting/receiving portion and letting ultrasonic waves be obliquely incident on the test object at a predetermined angle.

The thin film thickness measuring apparatus may further include a support portion that is provided at one side of the ultrasonic wave input portion to support oblique incidence of the ultrasonic wave input portion.

The ultrasonic wave may include one or more of a longitudinal wave (P wave) and a transverse wave (SV wave).

The ultrasonic retroreflector may include one or more of a diffractive lattice, a corner reflector, and an elastic retroreflector.

A thin film thickness measuring method according to an embodiment includes: preparing an ultrasonic retroreflector at a lower portion of the test object formed in a thin film shape to retroreflect the ultrasonic wave incident through the test object; providing an ultrasonic wave input portion on one side of the test object to let the ultrasonic wave be incident oblique at a predetermined angle to one side of the test object; and measuring a thickness of the test object by measuring an arrival time of the ultrasonic wave reflected through the test object by connecting the measuring portion to the ultrasonic wave incident portion.

Advantageous Effects

According to the embodiment, the ultrasonic wave propagation distance inside the thin film can be increased by measuring the thin film thickness using ultrasonic wave retroreflection, thereby overcoming the limitation of thin film thickness measurement.

In addition, according to the embodiment, the thin film thickness measurement limitations can be overcome even if an ultrasonic wave microscope of the same performance is used when measuring the thin film thickness, and defects or non-uniformity of the thin film can be inspected more accurately.

MODE FOR INVENTION

The terminology used herein is intended only to refer to a particular embodiment and is not intended to limit the present invention. As used herein, the singular forms also include the plural forms unless the phrases clearly indicate the opposite. As used in the specification, the meaning of "comprising" specifies a particular characteristic, domain, integer, step, operation, element, and/or component, and does not exclude the presence or addition of another particular characteristic, domain, integer, step, action, element, component, and/or group.

Although not defined differently, all terms including technical terms and scientific terms used herein have the same meaning as commonly understood by a person of an ordinary skill in the technical field to which the present invention is included. Terms defined in commonly used dictionaries are additionally interpreted as having meanings consistent with related technical literature and currently disclosed content, and are not interpreted in ideal or very formal meanings unless defined.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Figure 1:
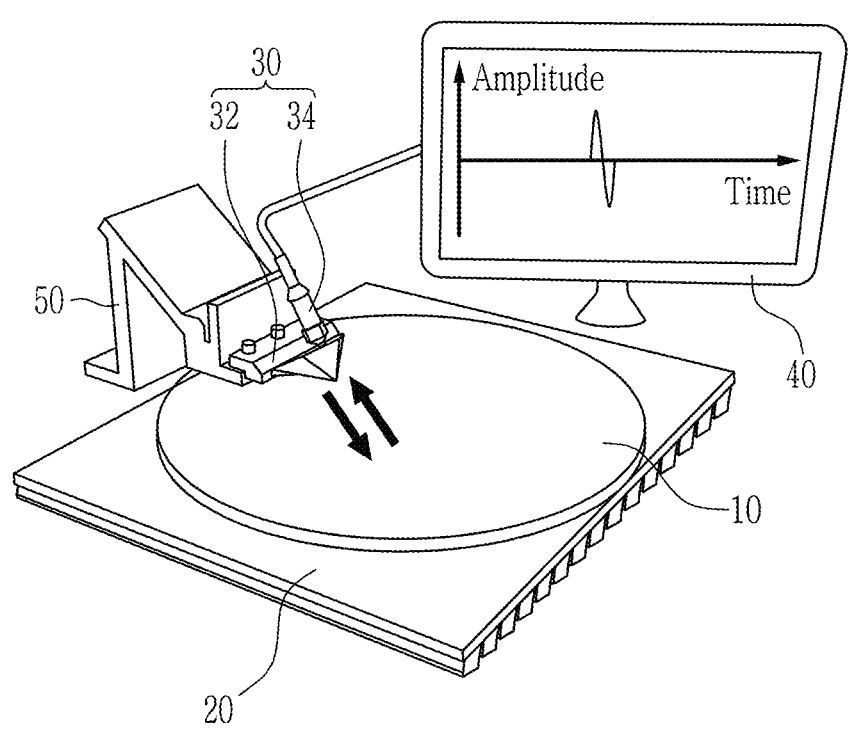
FIG. 1 shows a thin film thickness measuring apparatus according to an embodiment.

FIG. 1 shows a thin film thickness measuring apparatus according to an embodiment. Referring to FIG. 1, a thin film thickness measuring apparatus includes an ultrasonic retroreflector 20, an ultrasonic input portion 30, and a measurement portion 40.

The thin film thickness measuring apparatus may increase an arrival time of reflected ultrasonic waves by increasing an ultrasonic wave propagation distance inside the thin film. Accordingly, the thin film thickness measuring apparatus can overcome the thin film thickness measurement limit of the conventional art. In order to increase the ultrasonic wave propagation distance inside the thin film, the ultrasonic wave is incident at an angle rather than normally. In addition, the ultrasonic retroreflector 20 is provided under the thin film such that the obliquely incident ultrasonic wave can be reflected and returned as a wave source. Ultrasonic wave retroreflection can be used by providing an ultrasonic retroreflector 20 under the thin film.

The ultrasonic retroreflector 20 is provided at the bottom of a test object 10 formed in a thin film shape, and retroreflects the ultrasonic wave incident through the test object 10. Here, the ultrasonic wave may include one or more of a longitudinal wave (P wave) and a transverse wave (SV wave). The ultrasonic retroreflector 20 may include one or more of a diffraction lattice 20a, a corner reflector 20b, and an elastic retroreflector 20c.

The ultrasonic wave input portion 30 includes an ultrasonic wave transmitting/receiving portion 32 and an oblique incident portion 34, and is provided on one side of the test object 10 to be inspected, and thus ultrasonic waves can be incident to one side of the test object 10.

The ultrasonic wave transmitting/receiving portion 32 transmits an ultrasonic wave of a predetermined frequency to the test object 10 in advance, and observes the inside of the test object 10. The ultrasonic wave transmitting/receiving portion 32 transmits and receives ultrasonic waves. An ultrasonic wave signal output from the ultrasonic wave transmitting/receiving portion 32 is transmitted to the test object 10 through the inside of the oblique incident portion 34. The ultrasonic wave transmitting/receiving portion 32 may be provided at a corresponding position along an inclined surface of the oblique incident portion 34. In this case, the ultrasonic wave signal output from the ultrasonic wave transmitting/receiving portion 32 may be strongly output in an inclined direction of the oblique incident portion 34. An ultrasonic wave signal generated from the ultrasonic wave transmitting/receiving portion 32 may be incident on the test object 10 along an oblique direction of the oblique incident portion 34. The ultrasonic wave transmitting/receiving portion 32 may include an ultrasonic microscope or a transducer. Ultrasonic wave microscopy may be applied to the development of thin film thickness measurement equipment that requires a high level of accuracy. The ultrasonic wave microscopy may be directly used for semiconductor process inspection, where it is very important to accurately inspect defects or non-uniformity of thin films. The ultrasonic wave transmitting/receiving portion 32 may be coupled to an upper side of the oblique incident portion 34.

When the transducer is used as the ultrasonic wave transmitting/receiving portion 32, the ultrasonic wave is obliquely incident to increase the propagation distance of the ultrasonic wave in the thin film, and thus the reflected ultrasonic wave signal can be distinguished.

However, in the case of an ultrasonic wave thickness measuring device according to the conventional art, when the ultrasonic wave is incident at an angle, the amount of reception to the transducer may be very low due to the ultrasonic waves that are diffusely and specularly reflected. In order to overcome this, it is possible to maximize the amount of reception to the transducer by minimizing the diffusely and specularly reflected amount using ultrasonic wave retroreflection after placing the thin film on the ultrasonic retroreflector 20.

The oblique incident portion 34 may be provided on one side of the ultrasonic wave transmitting/receiving portion 32 to incline the ultrasonic wave incident to the test object 10 at a predetermined angle. The oblique incident portion 34 serves as a jig to install the ultrasonic wave transmitting/receiving portion 32 close to the thin film of the test object 10. The oblique incident portion 34 includes an installation surface and an inclined surface. For example, the installation surface of the oblique incident portion 34 is a surface in contact with a surface of the test object 10, and the inclined surface of the oblique incident portion 34 is formed at an acute angle with respect to the installation surface and is a surface in contact with the ultrasonic wave transmitting/receiving portion 32. The direction of the inclination of the slope of the oblique incident portion 34 may be disposed toward the test object 10. The oblique incident portion 34 may be formed by including a resin or a metal. The oblique incident portion 34 may have a polygonal columnar structure having an inclined surface. For example, the oblique incident portion 34 may be a triangular prism, a quadrangular prism, or a pentagonal prism having an inclined surface.

The thin film thickness measuring apparatus may further include a support portion 50 provided on one side of the ultrasonic wave input portion 30 to support oblique incidence of the ultrasonic wave input unit 30. The support portion 50 may be formed such that the ultrasonic wave transmitting/receiving portion 32 and the oblique incident portion 34 are safely supported and coupled.

The measurement portion 40 is connected to the ultrasonic wave input portion 30 and includes a function of measuring an arrival time of the ultrasonic wave reflected through the test object 10. The measurement portion 40 may include an oscilloscope. The measurement portion 40 outputs a driving signal to a cable, and thus the ultrasonic wave transmitting/receiving portion 32 transmits an ultrasonic wave signal, and simultaneously, the measurement portion 40 transmits the signal received by the ultrasonic wave transmitting/receiving portion 32 through the cable. After receiving the signal, the measurement portion 40 performs signal processing to measure a thickness of the thin film of the test object 10.

When the ultrasonic microscope is applied to the ultrasonic wave transmitting/receiving portion 32, an ultrasonic wave may be obliquely incident into a thin film by combining the oblique incident portion 34 (e.g., a wedge) with the ultrasonic microscope. The obliquely incident ultrasonic wave passes through the thin film at an angle, and is reflected back to an incident path by the ultrasonic retroreflector 20 as it is. Subsequently, the arrival time of the reflected ultrasonic wave is measured through the measurement portion 40 such that the thickness of the thin film may be calculated or defects or non-uniformity of the thin film may be inspected. Since a path of the incident ultrasonic wave and the reflected ultrasonic wave are the same, both transmitting and receiving are possible with a single ultrasonic wave sensor like an ultrasonic microscope, a thickness of a thin film can be accurately measured at a specific point, and signal processing can be easily carried out.

As described above, the thin film thickness measuring apparatus according to an embodiment presents the concept of the principle of measuring a thickness of a thin film using ultrasonic wave retroreflection. In the conventional art, the thickness of the thin film is calculated by measuring the reflection time of the ultrasonic wave incident normally on the thin film. As the thin film becomes thinner, the propagation distance of the ultrasonic wave becomes shorter, and thus the reflected ultrasonic wave cannot be distinguished. However, the thin film thickness measuring apparatus according to an embodiment uses oblique incidence of ultrasonic waves to increase the propagation distance of the ultrasonic waves. As the incident angle of the ultrasonic wave increases, the propagation distance of the ultrasonic wave inside the thin film increases, and the thickness measurement accuracy of the thin film can be increased as the propagation distance of the ultrasonic wave increases. In addition, retroreflection of the ultrasonic wave is used such that the obliquely incident ultrasonic wave can return to the wave source. When ultrasonic waves return to the wave source, both transmitting and receiving are possible with one ultrasonic wave sensor, so accurate thickness can be measured at a specific position of the thin film, and signal processing can be facilitated.

A thin film thickness measurement method according to an embodiment includes preparing an ultrasonic retroreflector 20 for retroreflecting ultrasonic waves incident through the test object 10 by providing the ultrasonic retroreflector 20 at a lower portion of the test object 10 formed in a thin film shape, making an ultrasonic wave incident obliquely to one side of the test object 10 at a predetermined angle by providing an ultrasonic wave input portion 30 on one side of the test subject 10, and measuring a thickness of the test object 10 by measuring an arrival time of the ultrasonic wave reflected through the test object 10 by connecting the measuring portion 40 to the ultrasonic wave input portion 30.

A thickness of the thin film may be using retroreflection of ultrasonic waves can be measured by using a thin film thickness measuring apparatus according to an embodiment. Using the thin film thickness measurement method according to an embodiment, the thin film thickness can be calculated by installing an ultrasonic retroreflector 20 under the thin film and then measuring a time taken for the ultrasonic wave obliquely incident through the thin film to be reflected and returned. Therefore, according to an embodiment, the thin film thickness that could not be measured by conventional art can be measured by overcoming the thin film thickness measurement limit of conventional art. In addition, according to an embodiment, the defect or non-uniformity of the thin film can be inspected more accurately than conventional art.

Figure 2A:
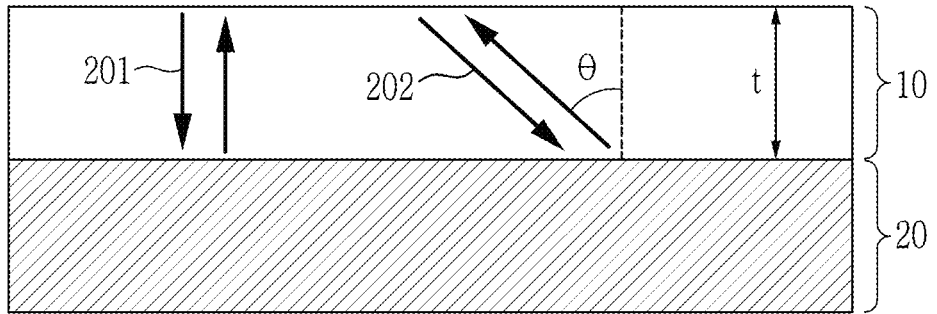
FIG. 2A shows a situation in which a normally incident ultrasonic wave and an obliquely incident ultrasonic wave are reflected from the thin film when an ultrasonic retroreflector is provided on a lower portion of a test object.
Figure 2B:
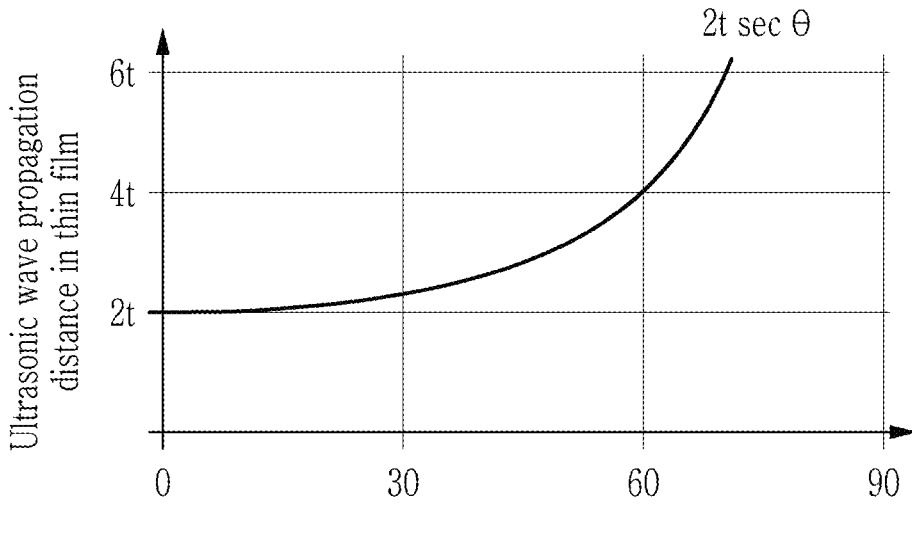
FIG. 2B shows an ultrasonic wave propagation distance in the thin film according to an incident angle of the ultrasonic wave.
Figure 2C:
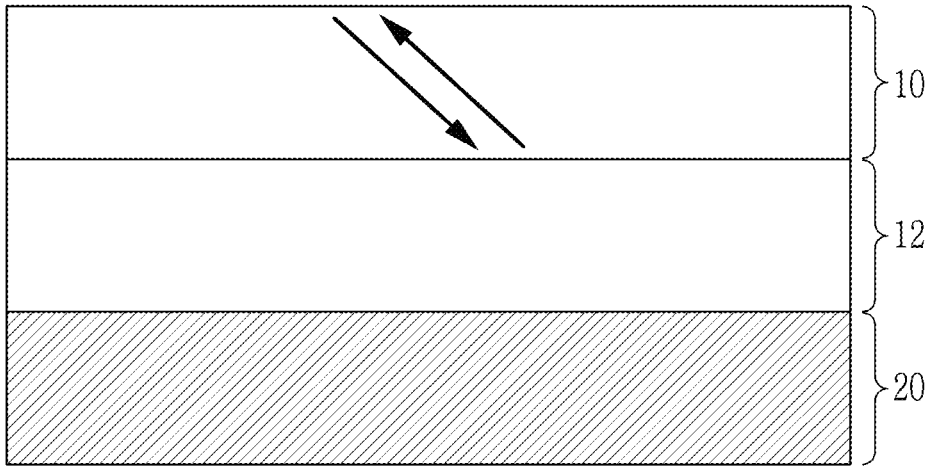
FIG. 2C shows a situation where the obliquely incident ultrasonic waves are retroreflected inside the thin film even if there is another layer between the thin film and the retroreflector.

A conceptual diagram of the thin film thickness measurement method according to an embodiment is shown in FIG. 2A to FIG. 2C.

FIG. 2A shows a situation in which a normally incident ultrasonic wave 201 and an obliquely incident ultrasonic wave 202 are reflected from the thin film when an ultrasonic retroreflector is provided on a lower portion of a test object. It appears that the obliquely incident ultrasonic wave 202 has a longer propagation distance inside the thin film than the normally incident ultrasonic wave 201.

FIG. 2B shows an ultrasonic wave propagation distance in the thin film according to an incident angle of the ultrasonic wave. It is shown that the ultrasonic wave propagation distance increases as the angle of incidence increases.

FIG. 2C shows a situation where the obliquely incident ultrasonic waves are retroreflected inside the thin film even if there is another layer between the thin film and the retroreflector. For example, in a situation where a thin film 10 is coated on a wafer 12, retroreflection of ultrasonic waves can be implemented inside the thin film 10 even when the retroreflector 20 is installed under the wafer 12.

A conceptual diagram of the ultrasonic retroreflector 20 will be presented and described. First, incident ultrasonic waves can be both longitudinal waves (P waves) and transverse waves (SV waves). In general, transverse waves with a shorter wavelength and better resolution may be preferred. A diffraction lattice 20*a*, a corner reflector 20*b*, an elastic retroreflector 20*c*, and the like may be used as the ultrasonic retroreflector 20, which will be described with reference to a conceptual diagram.

Figure 3A:
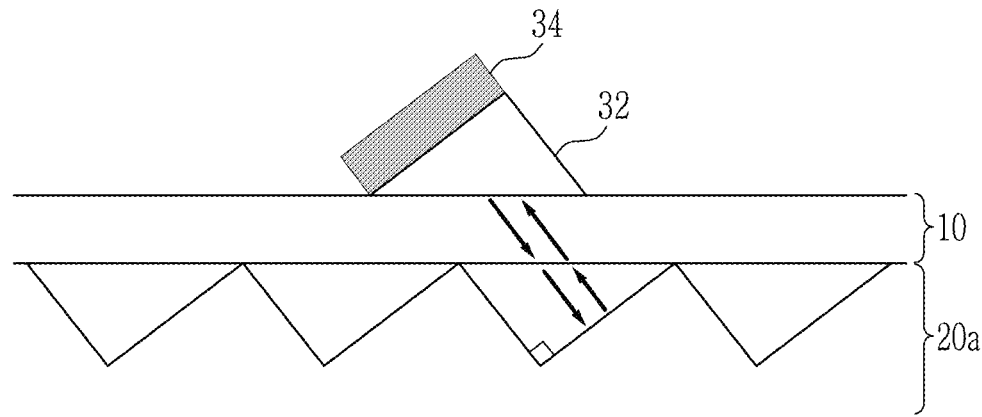
FIG. 3A shows retroreflection of ultrasonic waves in the diffraction lattice designed for a specific incident angle.

FIG. 3A shows retroreflection of ultrasonic waves in the diffraction lattice 20*a* designed for a specific incident angle. Incident ultrasonic waves can be both longitudinal and transverse waves. Although the structure of the reflector is simple, retroreflection is implemented only for a specific designed incident angle.

Figure 3B:
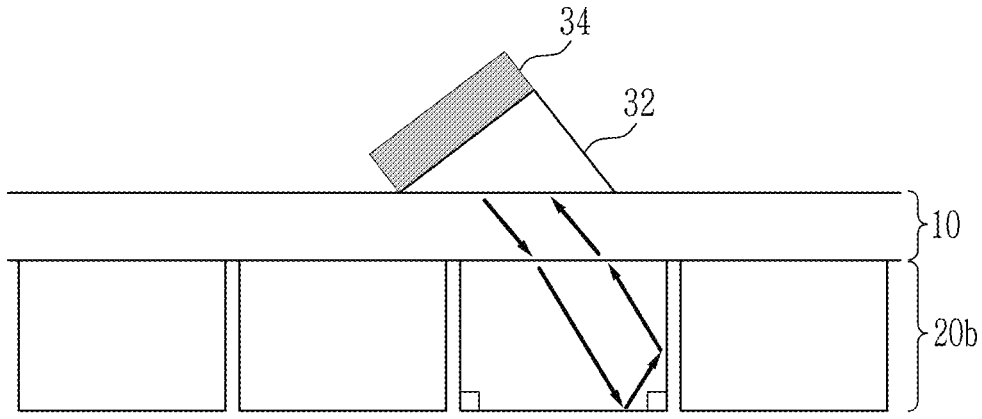
FIG. 3B shows a situation in which ultrasonic waves are retroreflected in the corner reflector.

FIG. 3B shows a situation in which ultrasonic waves are retroreflected in the corner reflector 20*b*. Although the structure of the reflector is simple and retroreflection is implemented for a wide incident angle range, incident ultrasonic waves are limited to transverse waves.

Figure 3C:
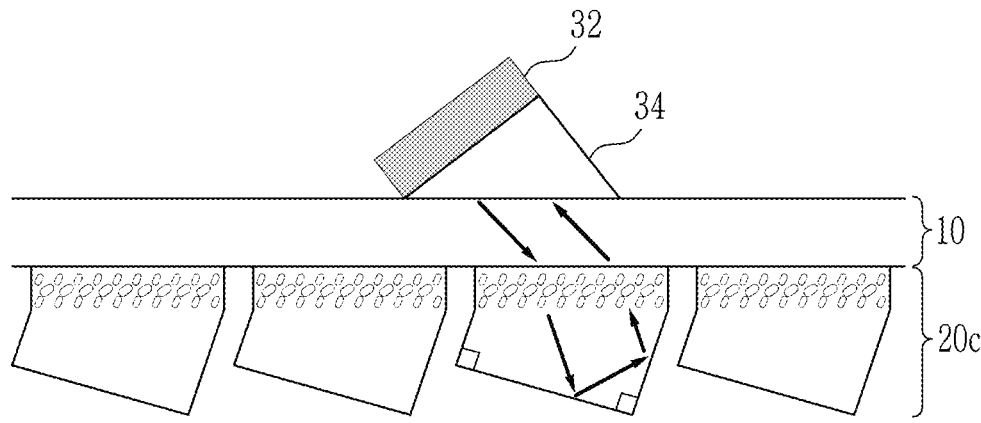
FIG. 3C shows retroreflection of ultrasonic waves in the elastic retroreflector.

FIG. 3C shows retroreflection of ultrasonic waves in the elastic retroreflector 20*c*. Incident ultrasonic waves can be both longitudinal and transverse waves, and retroreflection is implemented for a wide incident angle range, but the structure of the reflector is complex.

Simulation analysis results for a method of measuring thicknesses of single and multiple thin films using ultrasonic wave retroreflection will be suggested. The thin film thickness measuring apparatus according to an embodiment performs propagation simulation of elastic ultrasonic waves according to time for a single thin film formed of only aluminum and multiple thin films formed of aluminum and iron as the test object 10. Results for the simulation analysis are shown in FIG. 4A and FIG. 4B.

Figure 4A:
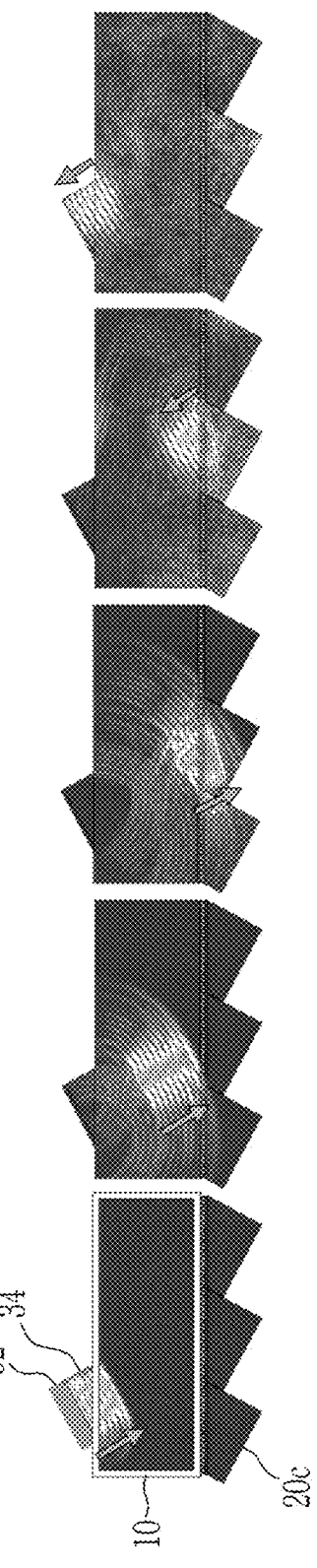
FIG. 4A shows an analysis result of elastic ultrasonic wave propagation simulation over time for the test object of a single thin film formed only of aluminum.

FIG. 4A shows an analysis result of elastic ultrasonic wave propagation simulation over time for the test object 10 of a single thin film formed only of aluminum. A longitudinal wave signal corresponding to 100 KHz is incident at an incident angle of 30 degrees, and the reflected wave returns along the incident path.

Figure 4B:
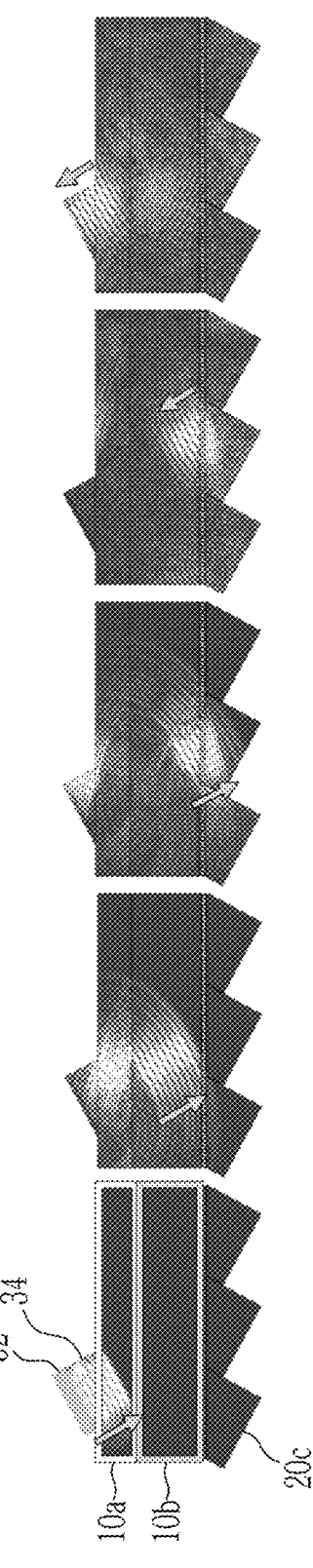
FIG. 4B shows a result of simulation analysis of elastic ultrasonic wave propagation over time for multiple thin films.

FIG. 4B shows a result of simulation analysis of elastic ultrasonic wave propagation over time for multiple thin films formed of aluminum (upper layer) and iron (lower layer). Referring to FIG. 4B, the simulation results of elastic ultrasonic wave propagation over time for multiple thin films including the first thin film 10a of the upper layer composed of aluminum and the second thin film 10b of the lower layer composed of iron are shown. A longitudinal wave signal corresponding to 100 KHz is incident at an incident angle of 30 degrees. Unwanted reflection occurs at the boundary of multiple thin films, but inside the thin film, the reflected wave returns along the incident path.

As described above, since the thin film thickness measuring apparatus according to an embodiment can increase the ultrasonic wave propagation distance inside the thin film, the thin film thickness measurement limit of the conventional art can be overcome. In the case of using the thin film thickness measuring apparatus according to an embodiment, even though an ultrasonic microscope with the same performance as conventional art is used, it is possible to measure a thickness of a thin film that could not be measured with conventional art, and it is possible to measure defects or non-uniformity of thin films can be inspected more accurately than conventional art. In addition, when using the thin film thickness measuring apparatus according to an embodiment, a thinner film thickness can be measured, and defects or non-uniformity of the film can be inspected more precisely. In addition, the performance can be dramatically improved even though the conventional system (ultrasonic microscope, signal processing device and method, and the like) other than the ultrasonic retroreflector 20 is used as it is.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

The invention claimed is:

1. A thin film thickness measuring apparatus comprising:
an ultrasonic retroreflector that is provided under a propagation path of an ultrasonic wave within a test object formed in the shape of a thin film with parallel top and bottom surfaces and retroreflects an ultrasonic wave incident through the test object;
an ultrasonic wave input portion that is provided on one side of the test object and comprising a single ultrasonic wave transceiver and an oblique incident portion, wherein the oblique incident portion is configured to make the ultrasonic wave incident into the test object at a single, predetermined oblique angle; and
a measurement portion that is connected to the ultrasonic wave input portion and measures an arrival time of the ultrasonic wave that travels diagonally through the test object from the ultrasonic wave input portion, is retroreflected by the ultrasonic retroreflector, and is returned to the single ultrasonic wave transceiver,
wherein the single, predetermined oblique angle is configured to select to increase the propagation distance of the ultrasonic wave within the test object.

2. The thin film thickness measuring apparatus of claim 1, wherein
the ultrasonic wave input portion comprises:
an ultrasonic wave transmitting/receiving portion that transmits an ultrasonic wave of a predetermined frequency to the test object in advance and observes the inside of the test object; and
an oblique incident portion provided on one side of the ultrasonic wave transmitting/receiving portion and letting ultrasonic waves be obliquely incident on the test object at a predetermined angle.

3. The thin film thickness measuring apparatus of claim 2, further comprising a support portion that is provided at one side of the ultrasonic wave input portion to support oblique incidence of the ultrasonic wave input portion.

4. The thin film thickness measuring apparatus of claim 1, wherein
the ultrasonic wave includes one or more of a longitudinal wave (P wave) and a transverse wave (SV wave).

5. The thin film thickness measuring apparatus of claim 1, wherein
the ultrasonic retroreflector includes one or more of a diffractive lattice, a corner reflector, and an elastic retroreflector.

6. A thin film thickness measuring method comprising:
preparing an ultrasonic retroreflector provided under a propagation path of an ultrasonic wave within a test object formed in a thin film shape with parallel top and bottom surfaces to retroreflect an ultrasonic wave incident through the test object;
providing an ultrasonic wave input portion on one side of the test object, the ultrasonic wave input portion comprising a single ultrasonic wave transceiver and an oblique incident portion, wherein the oblique incident portion is configured to make the ultrasonic wave incident into the test object at a single, predetermined oblique angle; and
measuring a thickness of the test object with a measuring portion by measuring an arrival time of the ultrasonic wave that travels diagonally through the test object from the ultrasonic wave input portion, is retroreflected by the ultrasonic retroreflector, and is returned to the single ultrasonic wave transceiver,
wherein the single, predetermined oblique angle is configured to select to increase the propagation distance of the ultrasonic wave within the test object.

7. The thin film thickness measuring method of claim 6, wherein
the ultrasonic wave includes one or more of a longitudinal wave (P wave) and a transverse wave (SV wave).

8. The thin film thickness measuring method of claim 6, wherein
the ultrasonic retroreflector comprises one or more of a diffractive lattice, a corner reflector, and an elastic retroreflector.

* * * * *